Patented Feb. 2, 1932

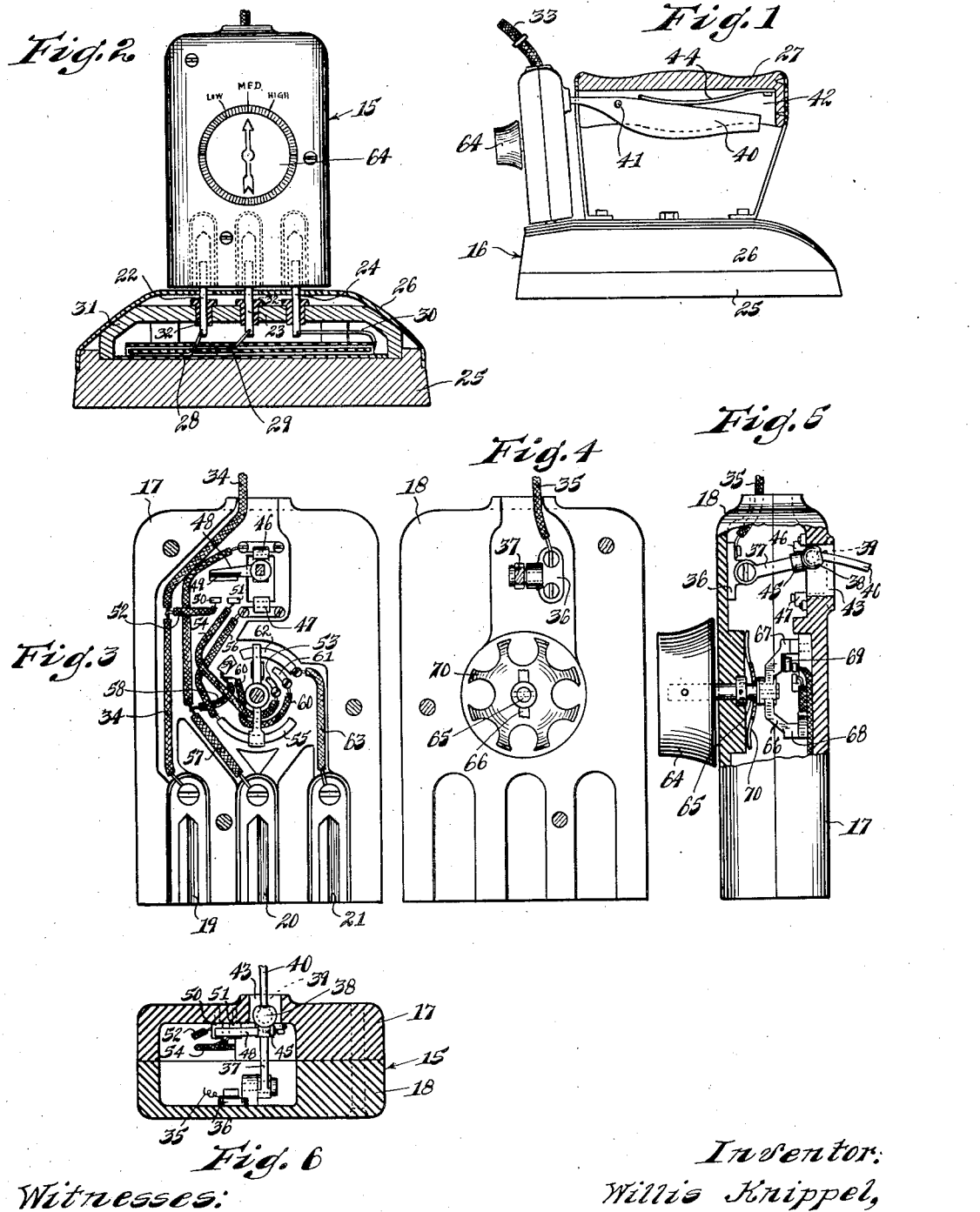

1,843,134

UNITED STATES PATENT OFFICE

WILLIS KNIPPEL, OF CHICAGO, ILLINOIS

ELECTRIC IRON

Application filed August 15, 1928. Serial No. 299,728.

This invention relates to improvements in electric irons and an object of the invention is the provision of means by which the amount of heat generated may be regulated or controlled. A further object is the provision of a plurality of electrical heating units and improved switching means for electrically connecting said units in parallel, in series, or connecting less than all of said units for the purpose of regulating the amount of heat generated, as well as the current consumption. A further object resides in providing means whereby when not in use, automatic switching means will be brought into operation to cause the generation of a less amount of heat.

In the ordinary use of an electric iron, the operator is often interrupted and required to leave the work for short periods of time. During such times of absence the electric curent is maintained at either the capacity of the electric iron or in accordance with the number of units electrically connected in the case of a multiple unit iron. Otherwise, the current is entirely disconnected, and thus, in the event the current is not disconnected, too much heat is usually generated, which causes deterioration of the iron and oftentimes burning or scorching of the garment or material being ironed. In the event the current is entirely disconnected the iron becomes cold and when work is resumed it is necessary to wait until a required heat is generated in the heating units. To overcome these and other objections, therefore, it is a further object to automatically cause the electric circuit to revert to a connection generating a comparatively low amount of heat when the operator releases the iron, and for automatically restoring the original connection when work is resumed by the operator.

Other objects will appear hereinafter.

The invention consists in the combinations and arrangements of parts hereinafter described and claimed.

The invention will be best understood by reference to the accompanying drawings forming a part of this specification, and in which:

Fig. 1 is an elevational view of the improved device in association with an electric iron;

Fig. 2 is a rear elevational view of the plug with the body portion of the electric iron in section;

Fig. 3 is an interior view of the forward portion of the plug;

Fig. 4 is a view of the interior of the rear portion of the plug;

Fig. 5 is a side view, partly in section, of the assembled plug;

Fig. 6 is a sectional view taken substantially on the line 6—6 of Fig. 5; and

Figure 7:
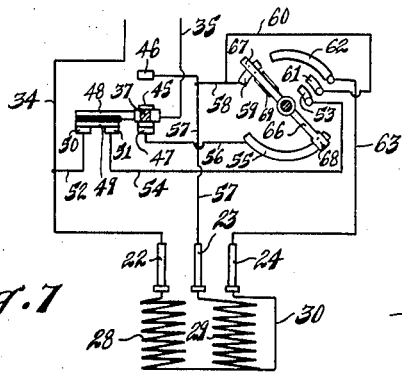
Figure 8:
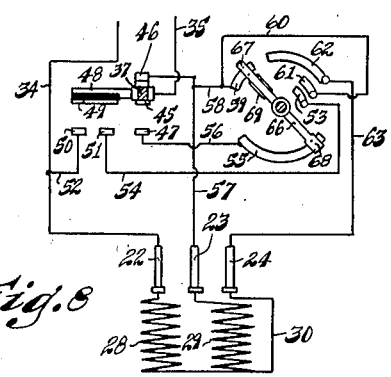

Figs. 7 to 12, inclusive, are wiring diagrams showing the disposition of the parts and electrical connections at various stages of operation as hereinafter explained.

As illustrated in the drawings, the preferred embodiment of the device comprises a plug 15 adapted to be detachably connected to an electric iron 16. Plug 15 is preferably composed of a forward half portion 17 and a rear half portion 18, bolted together in the usual manner and provided with sockets 19, 20, and 21, adapted to register with and engage prongs 22, 23, and 24, respectively, of the iron 16.

Iron 16 is composed of a lower ironing portion 25, a shell portion 26 and a handle member 27, prong 22 constitutes one terminal of a heating unit 28 composed of suitable resistance material, and prong 24 constitutes the other terminal. In the illustrative embodiment a second heating unit 29, preferably of equal resistance, is connected to intermediate prong 23 and prong 24, as more clearly shown in the wiring diagrams Figs. 7 to 12, inclusive. The heating units 28 and 29 are preferably disposed with one overlying the other and distributed throughout the interior of the iron so as to cause a more equal distribution of heat. Thus, as shown, one terminal of heating unit 28 is connected to prong 22, one terminal of heating unit 29 is connected to prong 23, and the opposite terminals of both heating units are connected to prong 24 by means of wire 30. The respective prongs are insulated from cap 31 by insulation plugs 32.

The main lead-in cord 33 carries wire 34 which is connected to socket 19 adapted in turn to engage prong 22. The second wire 35 carried by cord 33 is connected to plate 36 mounted upon the rear half 18 of the plug, and pivotally mounted upon plate 36 and extending forwardly therefrom is an arm 37, upon the forward extremity of which is mounted a socket 38, adapted to receive ball 39 of switch lever 40 pivotally mounted at 41 within longitudinal groove 42 of handle member 27. Thus the ball and socket connection 38, 39 is adapted to move vertically and within slot 43 provided on the forward face of member 17, and the parts are normally maintained in the position shown in Fig. 5 by leaf spring 44 mounted in groove 42 as shown in Fig. 1. Switch lever 40 is preferably composed of non-conducting material.

Mounted upon arm 37 is a contact block 45 arranged to contact with upper block 46 when the iron is not in use and lever 40 is in lowered position, as shown in Fig. 1. When in use, switch lever 40 is elevated in the grasping of the handle by the operator which causes block 45 on arm 37 to be lowered into contact with block 47. Extending laterally from arm 37 is a projection 48 which carries a contact plate 49, insulated from projection 48, whereby plate 49 will bridge and connect contacts 50 and 51, when arm 37 is lowered while the iron is in use.

Contact 50 is connected to wire 34 by wire 52, and contact 51 is connected to contact 53 by wire 54. Block 47 is connected to curved contact plate 55 by wire 56, and upper block 46 is connected to socket 20 by wire 57. Branching from wire 57 is wire 58 connected to contact plate 59, and wire 60 forms a continuation of wire 58 and is connected to plate 61. Contact plate 62 is connected to socket 21 by wire 63.

Figure 9:
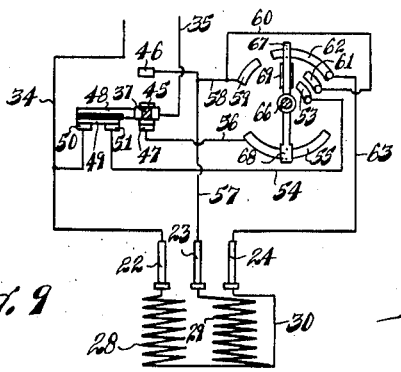
Figure 11:
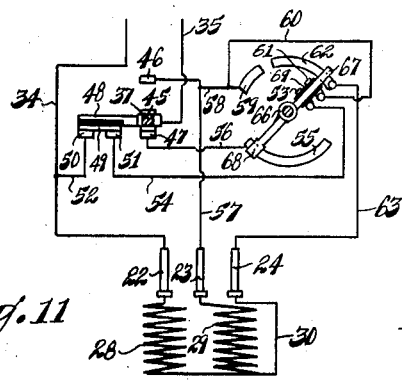
Figure 12:
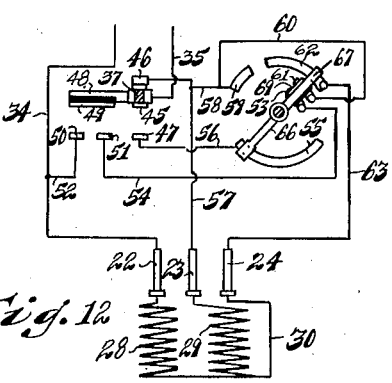

In the present embodiment of the invention, provision is made for setting the device to selectively generate three stages of heat, conveniently referred to as low, medium and high, and this is accomplished by selectively connecting the two heating units in series for the low heat, connecting and utilizing but one of the heating units for the medium stage, and connecting the heating units in multiple or parallel for the maximum or high stage of heat. In carrying out this purpose a rotary switch is employed comprising a hand dial 64 which carries an inwardly extending shaft 65 upon the forward end of which is mounted bar 66 having a contact brush 67 formed on the upper end thereof, a contact brush 68 formed upon the lower end, and an intermediate contact brush 69 insulated from the bar 66. A spring disk 70 is interposed to maintain the brushes in frictional engagement with the contact plates. Brush 67 is adapted to alternately contact with plates 59 and 62, brush 68 is in continuous contacting engagement with plate 55 and the intermediate bridging brush 69 is in engagement with and is adapted to electrically contact plates 53 and 61 only when the dial switch is adjusted for the maximum heat. Thus, the switch dial is adjustable to three positions for the three stages of heat. When adjusted for low heat, as shown in Fig. 7, plates 55 and 59 are electrically connected through the bar 66. When adjusted for medium heat, as shown in Fig. 9, plates 55 and 62 are electrically connected through bar 66, and when adjusted for maximum heat, as shown in Fig. 11, plates 55 and 62 are electrically connected, and also plates 53 and 61 are electrically connected through the intermediate bridging brush 69.

Figure 10:
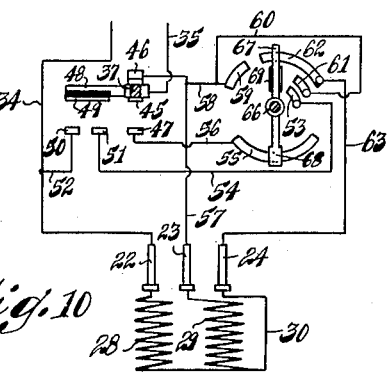

The operation will be readily understood by reference to the wiring diagrams. Fig. 7 illustrates the relative positions of the contacting members when the dial switch is set for low heat and the iron is in use and therefore switch lever 40 raised causing the lowering of arm 37. At this stage the heating units are connected in series, the current passing through wire 34, heating unit 28, unit 29, wire 57, wire 58, plate 59, bar 66, plate 55, wire 56, contact 47, block 45 and wire 35. When the device is not in use and switch lever 40 released, arm 37 assumes the position diagrammatically shown in Fig. 8 and also shown in Fig. 5, wherein the heating units remain in series, the current passing through wire 34, units 28 and 29 in series, wire 57, contact 46, block 45, and wire 35. When adjusted for medium operating heat, as shown in Fig. 9, the current passes through wire 34, heating unit 28, wire 30, wire 63, plate 62, bar 66, plate 55, wire 56, contact 47, block 45, and wire 35, and thus it will be seen that unit 29 is not included in the circuit. When the handle is released, arm 37 is raised making a circuit as shown in Fig. 10, in which the current follows the course described in connection with Fig. 8 and the heating units are returned to series connection. Fig. 11 illustrates diagrammatically the dial switch adjusted for maximum heat with the lever switch 40 elevated to depress arm 37. In this adjustment the heating units 28 and 29 are connected in parallel, the current passing through wire 34, unit 28, wire 63, plate 62, bar 66, plate 55, wire 56, contact 47, block 45, and wire 35; but the current also passes through branch wire 52 leading from wire 34, contact 50, plate 49, contact 51, wire 54, plate 53, intermediate brush 69, plate 61, wire 60, wire 57, heating unit 29, wire 30, wire 63, plate 62, bar 66, plate 55, wire 56, contact 47, block 45, and wire 35. However, with this same adjustment of the dial switch, when handle 27 is released by the operator, causing switch lever 40 to be lowered, arm 37 within the plug is raised and the circuit is changed to that diagrammatically shown in Fig. 12, again connecting the heating units 28 and 29 in series as in Figs. 8 and 10.

The complementary portions of the plug may be bolted together in the usual manner, and when the plug is engaged or disengaged, the ball and socket connection between arm 37 and lever 40 is likewise engaged or disengaged. Also, if desired, a master switch may be interposed at any point along either of the lead-in wires.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

I claim:

1. In combination, an electric iron provided with two heating units, a switch casing, a lead-in wire connected to a termial of one of said heating units, a connection between the opposite terminal of said heating unit and the first terminal of the second heating unit, an upper contact block mounted in said casing, a connection between said upper contact block and the second terminal of the second heating unit, a lever provided with a movable contact block adapted when in raised position to contact with said upper contact block, a second lead-in wire connected to said movable contact block, a lower stationary contact block adapted to be contacted by said movable contact block when the latter is in lowered position, a lower contact plate, a connection between said lower contact plate and said lower stationary contact block, a dial switch provided with a contact bar having a lower arm and an upper arm, said lower arm arranged to be in continuous contact with said lower contact plate, an upper contact plate arranged to contact with said upper arm in one position, and a connection between said upper contact plate and the second terminal of said second heating unit.

2. In combination, an electric iron provided with two heating units, a switch casing, a lead-in wire connected to a terminal of one of said heating units, a connection between the opposite terminal of said heating unit and the first terminal of the second heating unit, an upper contact block mounted in said casing, a connection between said upper contact block and the second terminal of the second heating unit, a lever provided with a movable contact block adapted when in raised position to contact with said upper contact block, a second lead-in wire connected to said movable contact block, a lower stationary contact block adapted to be contacted by said movable contact block when the latter is in lowered position, a lower contact plate, a connection between said lower contact plate and said lower stationary contact block, a dial switch provided with a contact bar having a lower arm and an upper arm, said lower arm arranged to be in continuous contact with said lower contact plate, an upper contact plate arranged to contact with said upper arm in one position, a connection between said upper contact plate and the second terminal of said second heating unit, a second upper contact plate arranged to contact with said upper arm in a second position, and a connection between said second upper contact plate and the second terminal of said first mentioned heating unit.

3. In combination, an electric iron provided with two heating units, a switch casing, a lead-in wire connected to a terminal of one of said heating units, a connection between the opposite terminal of said heating unit and the first terminal of the second heating unit, an upper contact block mounted in said casing, a connection between said upper contact block and the second terminal of the second heating unit, a lever provided with a movable contact block adapted when in raised position to contact with said upper contact block, a second lead-in wire connected to said movable contact block, a lower stationary contact block adapted to be contacted by said movable contact block when the latter is in lowered position, a lower contact plate, a connection between said lower contact plate and said lower stationary contact block, a dial switch provided with a contact bar having a lower arm and an upper arm, said lower arm arranged to be in continuous contact with said lower contact plate, an upper contact plate arranged to contact with said upper arm in one position, a connection between said upper contact plate and the second terminal of said second heating unit, a movable contact plate mounted upon said lever switch and insulated therefrom, a pair of contact members mounted in said casing and adapted to be bridged by said movable contact plate when said lever switch is in lowered position, a connection between the first of said pair of contact members and said first mentioned lead-in wire, a bridging brush mounted upon said upper arm and insulated therefrom, a second pair of contact members adapted to be contacted by said brush when said upper arm is in a third position, a connection between the second of said first pair of contact members and one of said second pair of contact members, and a connection between the other contact member of said second pair and the second terminal of said second heating unit.

4. In combination, an electric iron provided with two heating units, a switch casing, a lead-in wire connected to a terminal of one of said heating units, a connection between the opposite terminal of said heating unit and the first terminal of the second heating unit, an upper contact block mounted in said casing, a connection between said upper contact block and the second terminal of the second heating unit, a lever provided with a movable contact block adapted when in raised position to contact with said upper contact block, a second lead-in wire connected to said movable contact block, a lower stationary contact block adapted to be contacted by said movable contact block when the latter is in lowered position, a lower contact plate, a connection between said lower contact plate and said lower stationary contact block, a dial switch provided with a contact bar having a lower arm and an upper arm, said lower arm arranged to be in continuous contact with said lower contact plate, an upper contact plate arranged to contact with said upper arm in one position, a connection between said upper contact plate and the second terminal of said second heating unit, a second upper contact plate arranged to contact with said upper arm in a second position, a connection between said second upper contact plate and the second terminal of said first mentioned heating unit, a movable contact plate mounted upon said lever switch and insulated therefrom, a pair of contact members mounted in said casing and adapted to be bridged by said movable contact plate when said lever switch is in lowered position, a connection between the first of said pair of contact members and said first mentioned lead-in wire, a bridging brush mounted upon said upper arm and insulated therefrom, a second pair of contact members adapted to be contacted by said brush when said upper arm is in a third position, a connection between the second of said first pair of contact members, and one of said second pair of contact members, and a connection between the other contact member of said second pair and the second terminal of said second heating unit.

WILLIS KNIPPEL.